US012646134B2

(12) United States Patent (10) Patent No.: US 12,646,134 B2
Zhao et al. (45) Date of Patent: Jun. 2, 2026

(54) IMAGE PROCESSING METHOD BASED ON CONVOLUTION ALGORITHM AND CHIP

(71) Applicant: AMICRO SEMICONDUCTOR CO., LTD., Zhuhai (CN)

(72) Inventors: Yifan Zhao, Zhuhai (CN); Huibao Huang, Zhuhai (CN); Jinjie Chen, Zhuhai (CN); Sixia You, Zhuhai (CN); Ziqian Zhang, Zhuhai (CN)

(73) Assignee: AMICRO SEMICONDUCTOR CO., LTD., Zhuhai (CN)

( * ) Notice: Subject to any disclaimer, the term of this patent is extended or adjusted under 35 U.S.C. 154(b) by 282 days.

(21) Appl. No.: 18/703,409

(22) PCT Filed: Aug. 8, 2022

(86) PCT No.: PCT/CN2022/110900
§ 371 (c)(1),
(2) Date: Apr. 22, 2024

(87) PCT Pub. No.: WO2023/065780
PCT Pub. Date: Apr. 27, 2023

(65) Prior Publication Data
US 2025/0238897 A1 Jul. 24, 2025

(30) Foreign Application Priority Data
Oct. 20, 2021 (CN) .......................... 202111218196.8

(51) Int. Cl.
*G06T 1/20* (2006.01)
*G06T 3/4084* (2024.01)

(52) U.S. Cl.
CPC .............. *G06T 1/20* (2013.01); *G06T 3/4084* (2013.01)

(58) Field of Classification Search
CPC .......... G06T 1/20; G06T 3/4084; Y02D 10/00
See application file for complete search history.

(56) References Cited

U.S. PATENT DOCUMENTS 6,859,816 B2 * 2/2005 Makino ................. G06F 17/142
708/404
2020/0293857 A1 9/2020 Nakadai et al.

FOREIGN PATENT DOCUMENTS

CN 107248158 A 10/2017
CN 109934802 A 6/2019
(Continued)

OTHER PUBLICATIONS

Qi Liu, Zi Huang and Fuqiao Hu, "Accelerating convolution-based detection model on GPU," 2015 International Conference on Estimation, Detection and Information Fusion (ICEDIF), Harbin, China, 2015, pp. 61-66, doi: 10.1109/ICEDIF.2015.7280163. (Year: 2015).*
(Continued)

*Primary Examiner* — Utpal D Shah
(74) *Attorney, Agent, or Firm* — The Roy Gross Law Firm, LLC; Roy Gross

(57) ABSTRACT

The present applicant discloses an image processing method based on a convolution algorithm and a chip using the same. The image processing method comprises: step A, using a fast Fourier transform and a fast Fourier inverse transform to control an image template and an image to be processed to obtain convolution result elements in a space domain in a form of multiplication in a frequency domain; and step B, in which if there is a convolution result element that satisfies a preset gray value condition, then a gray value of a pixel point corresponding to the convolution result element in the image to be processed is set as a preset target gray value. The complexity of the calculation time is reduced, the volume of data for processing pixel points is also decreased, and the real-time performance of image processing is ensured.

13 Claims, 1 Drawing Sheet

(56) References Cited

FOREIGN PATENT DOCUMENTS

| CN | 111428188 A | 7/2020 |
| CN | 112183493 A | 1/2021 |
| CN | 112364989 A | 2/2021 |

OTHER PUBLICATIONS

Lavin, Andrew, and Scott Gray. "Fast algorithms for convolutional neural networks." Proceedings of the IEEE conference on computer vision and pattern recognition. 2016. (Year: 2016).*

Hirani, Anil N., and Takashi Totsuka. "Combining frequency and spatial domain information for fast interactive image noise removal." Proceedings of the 23rd annual conference on Computer graphics and interactive techniques. 1996. (Year: 1996).*

Chinese Office Action for Chinese Patent Application No. 202111218196.8, dated May 28, 2025, 28pp.

MuMengSunny. "19.图像扩展 (Non-official translation: 19. Image Expansion)". Available online: [https://blog.csdn.net/qq_43466323/article/details/114891460?ops_request_misc=&request_id=&biz_id=102&utm_term=mumeng], 16pp.

Ring_Rain. 傅里叶变换 [3]: 卷积与傅里叶的关系 (Non-official translation: Fourier Transform [3]: The Relationship between Convolution and Fourier). Available online: [https://blog.csdn.net/qq_30263737/article/details/91572274?ops_request_misc=elastic_search_misc&request_id=a30362db6d457d22c6ddabbd3828933d&biz_id=0&%E2%80%A6], 8pp.

Chen yiyue's programming experience, "《OpenCv视觉之眼》Python图像处理九 :Opencv图像形态学处理之图像腐蚀 与膨胀原理及方法 (Nonofficial translation: <OpenCV Vision Eye> Python Image Processing IX: OpenCV Image Morphological Processing and an Image Corrosion and Expansion Principle and Method)". Available online: [https://blog.csdn.net/qq_42451251/article/details/107901746], 18pp.

Gehulushang, "傅里叶变换和卷积", (Non-official translation: Fourier Transform and Convolution)". Available online: [https://blog.csdn.net/gehulushang/article/details/102831400?ops_request_misc=elastic_search_misc&request_id=0e2263a6cce415c1d2f0c3df2740d116&biz_id=0&utm_medium=distribute.pc_search_result.none-task-blog-2~all~ElasticSearch~search_v2-8-102831400-null-null.1420v1020pc_search_result_base9&utm_term=%E5%82%85%E9%87%8C%E5%8F%B6%E5%8F%98%E6%.

PCT International Search Report for International Application No. PCT /CN2022/110900, mailed Nov. 1, 2022, 7pp.

PCT Written Opinion for International Application No. PCT /CN2022/110900, mailed Nov. 1, 2022, 6pp.

* cited by examiner using a fast Fourier transform and a fast Fourier inverse transform to control an image template and an image to be processed to obtain convolution result elements in a space domain in a form of multiplication in a frequency domain step A if there is a convolution result element that satisfies a preset gray value condition, then a gray value of a pixel point corresponding to the convolution result element in the image to be processed is set as a preset target gray value step B

IMAGE PROCESSING METHOD BASED ON CONVOLUTION ALGORITHM AND CHIP

CROSS REFERENCE TO RELATED APPLICATIONS

This application is a National Phase of PCT Patent Application No. PCT/CN2022/110900 having International filing date of Aug. 8, 2022, which claims the benefit of priority of Chinese Patent Application No. 202111218196.8, filed Oct. 20, 2021, the contents of which are all incorporated herein by reference in their entirety.

TECHNICAL FIELD

The disclosure relates to the technical field of image processing, in particular to an image processing method based on a convolution algorithm and a chip using the same.

BACKGROUND

The expansion algorithm is a basic algorithm among various image morphology algorithms. The expansion algorithm is to merge all background pixel points in contact with the area to be processed into the area to be processed, so that the boundary of the area to be processed expands externally. Therefore, the main uses of the expansion algorithm comprise eliminating noise, segmenting independent image pixel points, connecting adjacent pixel points in the image, finding obvious maximum or minimum value areas in the image, and finding out the gradient of the image, etc.

Those skilled in the art can easily understand that in the most basic part of the dilation and erosion operations, a structural element is designed to test an output image, which is usually much smaller than the image to be processed. Moreover, the structural element in an two-dimensional plane is composed of a matrix, and the origin of the structural element specifies the pixel range to be processed in the image.

In an image area covered by the structural element, a pixel point (x, y) with a gray value of A may be used as a search center, and the gray value of any pixel point in the neighborhood of the search center is set to B. Moreover, a conventional way to set the gray value to B is to set the gray value of all pixel points in the image area covered by the structural element to B by row and by column, or to perform specific logic operations on an area of the structural element corresponding to the binary image covered by the structural element (the binary image is converted from the image to be processed) to set the gray value of the pixel points in the neighborhood of the pixel point (x, y) whose gray value is A to B. By means of this way, they often make the pixel points with gray value of B be relatively increased. However, the time complexity generated when the aforementioned algorithm is applied to traverse the entire image will increase exponentially, and thus when the expansion calculation is performed on a larger image, it will take a long time and cannot be effectively applied to the image processing field having a high requirement on real-time and variability.

SUMMARY

The present invention discloses an image processing method based on a convolution algorithm and a chip using the same. The specific technical scheme is as follows.

An image processing method based on a convolution algorithm comprises: step A, using a fast Fourier transform and a fast Fourier inverse transform to control an image template and an image to be processed to obtain convolution result elements in a space domain in a form of multiplication in a frequency domain; and step B, in which if there is a convolution result element that satisfies a preset gray value condition, then a gray value of a pixel point corresponding to the convolution result element in the image to be processed is set as a preset target gray value.

Further, the step B specifically comprises: a step that if it is detected that a value of the convolution result element is greater than 0, a gray value of a pixel point covered by a center of the image template corresponding to the convolution result element in the image to be processed is set as the preset target gray value.

Further, in the step B, if it is detected that the value of the convolution result element is greater than 0, it is determined that the image template corresponding to the convolution result element has a pixel point whose gray value is a preset search value in the image area framed in the image to be processed, and then determined that a convolution result element obtained in the currently executed step A satisfies the preset gray value condition; wherein, the image template corresponding to the convolution result element is a convolution template configured to support translation in the image to be processed for a purpose of matrix convolution operation.

Further, the image template is a convolution kernel in the form of a matrix, and there are matrix elements with a value of 1 and matrix elements with a value of 0 in the image template, wherein positional features of the matrix elements with the value of 1 distributed in the image template determine pixel points actually participating in the image processing method in the image to be processed.

Further, in the image template, a shape composed of the matrix elements with the value of 1 is defined as a shape of the image template.

Further, the preset search value is greater than 0; or the preset search value has a mapping value of 1 that is converted by a preset pixel value function.

Further, the step A specifically comprises: transforming the image to be processed from the space domain to the frequency domain by using a two-dimensional discrete Fourier transform so as to obtain a first parameter matrix; transforming the image template from the space domain to the frequency domain by using a two-dimensional discrete Fourier transform so as to obtain a second parameter matrix; multiplying each matrix element of the first parameter matrix with a matrix element in a corresponding matrix position of the second parameter matrix so as to obtain a third parameter matrix; using a two-dimensional discrete Fourier inverse transform to transform the third parameter matrix from the frequency domain to the space domain, and obtaining a convolution result matrix, so as to realize an obtainment of convolution result elements in a corresponding space domain in a form of multiplication in a corresponding frequency domain by controlling the image template and the image to be processed;

wherein, the aforementioned convolution result elements in the corresponding space domain are arranged as a convolution result matrix; a relative position of a convolution result element in the convolution result matrix is the same as a relative position of the center of the image template corresponding to the same convolution result element in the image to be processed; the relative position is a positional relationship of a matrix element relative to a matrix element of a fixed corner position of the matrix to which it belongs.

Further, the image template is equivalently configured as follows: during a translation process of the image template in the image to be processed, every time the center of the image template covers a pixel point of the image to be processed, the matrix convolution operation is performed by the elements existing in the image template itself and the pixel points in the image area currently framed by the image template to obtain one convolution result element; after the center of the image template has traversed all the pixel points in the image to be processed, all the convolution result elements obtained through the matrix convolution operation form an output matrix, and the output matrix is equal to the convolution result matrix; wherein, all elements in the image template are preconfigured; all elements in the image to be processed are also preconfigured.

Further, when it is detected that the value of the convolution result element is greater than 0, in the neighborhood of the pixel point covered by the center of the image template corresponding to the convolution result element within the image to be processed, there are pixel points with the gray value which is the preset search value.

Further, each matrix element in the first parameter matrix is a Fourier coefficient described in a form of the two-dimensional discrete Fourier transform; each matrix element in the second parameter matrix is a Fourier coefficient described in the form of the two-dimensional discrete Fourier transform; the number of rows of the third parameter matrix, the number of rows of the second parameter matrix and the number of rows of the first parameter matrix are all equal; the number of columns of the third parameter matrix, the number of columns of the second parameter matrix and the number of columns of the first parameter matrix are all equal; the number of rows of the convolution result matrix is equal to the number of rows of a pixel matrix corresponding to the image to be processed; the number of columns of the convolution result matrix is equal to the number of columns of a pixel matrix corresponding to the image to be processed.

A chip, the chip stores a program code corresponding to the image processing method based on a convolution algorithm.

Further, the chip is integrated with a convolution hardware accelerator, the convolution hardware accelerator is used to convert a matrix convolution operation between the image to be processed and the image template into a convolution operation between two sequences; wherein, each element in each sequence is a result of a one-dimensional discrete Fourier transform performed by the convolution hardware accelerator on a row of elements of a matrix, or a result of a one-dimensional discrete Fourier transform performed by the convolution hardware accelerator on a column element of a matrix; each element in each sequence is obtained by parallel processing by the convolution hardware accelerator.

Further, the chip is integrated with a convolution hardware accelerator, the convolution hardware accelerator is used to multiply a transformation value of the image to be processed in the frequency domain with a transformation value of the corresponding image template participating in a matrix convolution operation in the frequency domain, and output a parameter matrix, and then firstly perform a one-dimensional discrete Fourier inverse transform on each row of elements of the parameter matrix in parallel to obtain an intermediate result sequence, and secondarily perform a one-dimensional discrete Fourier inverse transform on each column of elements of the intermediate result sequence in parallel to finally obtain a convolution result matrix so as to complete a two-dimensional inverse discrete Fourier inverse transform; Alternatively, the convolution hardware accelerator is used to multiply a transformation value of the image to be processed in the frequency domain with a transformation value of the corresponding image template participating in a matrix convolution operation in the frequency domain and output a parameter matrix, and then firstly perform a one-dimensional discrete Fourier inverse transform on each column of elements of a parameter matrix in parallel to obtain an intermediate result sequence, and secondarily perform a one-dimensional discrete Fourier inverse transform on each row of elements of the intermediate result sequence in parallel to finally obtain a convolution result matrix.

Compared with the prior art, the beneficial technical effect of the present invention is as follows. On one hand, for the equivalent convolution result obtained by fast Fourier transform of the image template and the image to be processed, when there is a pixel point with a preset search value present in a specific neighborhood of the image template (the image area framed by the image template) in the center of the image template, the gray value in the center of the image template is configured as the preset target gray value. Compared with the assignment processing of various gray values mentioned in the background, the present invention does not need to assign values to the pixel points outside the boundary of the image to be processed, which in turn avoids an excessive expansion of the boundary points of the image to be processed, reduces the volume of data for processing the pixel points, and thus ensures real-time image processing.

On the other hand, when the size of the image to be processed is relatively large, in order to reduce the huge cost of calculation time brought by the traditional convolution operation or the expansion search operation, the present invention successively uses fast Fourier transform and fast Fourier inverse transform to accelerate the convolution process of the image to be processed and the image template, so as to speed up the acquisition of pixel points that need to be reassigned in the corresponding image area, thereby speeding up the process of image expansion calculation, and reducing the number of calculations. Especially, the more discrete pixel points in the processed image, the more significant the calculation time saving degree of the present invention is. The use of fast Fourier transform instead of convolution operation is mainly to reduce the amount of calculation and storage overhead, and is particularly beneficial to hardware implementation.

BRIEF DESCRIPTION OF THE DRAWINGS

FIG. 1 is a flowchart of an image processing method based on a convolution algorithm according to an embodiment of the present disclosure.

DETAILED DESCRIPTION

The technical solutions in the embodiments of the present invention will be described in detail below with reference to the drawings in the embodiments of the present invention. It should be understood that the specific embodiments described below are only used to explain the present invention, not to limit the present invention. In the following description, specific details are given to provide a thorough understanding of the embodiments. However, those skilled in the art will understand that the embodiments may be implemented without these specific details. For example, circuits may be shown in block diagrams in order not to obscure the embodiments in unnecessary detail. In other instances, well-known circuits, structures and techniques have not been shown in detail in order not to obscure the embodiments.

As an embodiment, the present invention discloses an image processing method based on a convolution algorithm, as shown in FIG. 1, specifically comprising:

step A, using a fast Fourier transform and a fast Fourier inverse transform to control an image template and an image to be processed to obtain convolution result elements in a space domain in a form of multiplication in a frequency domain; then entering step B.

Specifically, in this embodiment, the image template is set as a basic operation unit for performing dilation or other morphological image processing on the image to be processed, the image template is usually smaller than the image to be processed. The image template is a convolution template configured to support translation in the image to be processed for the purpose of matrix convolution operation, that is, the image template is a convolution kernel used to scan the image to be processed.

In combination with the background technology, it can be seen that the image template can frame the range of pixels to be processed in the image to be processed, and the "AND" operation can be performed with the image template and the binary image covered by it, which is equivalent to a matrix convolution between the image template and the image to be processed, that is, performing a multiplication and addition operation for all pixel points in the image area currently framed by the image template. If the result of a convolution operation is 0, then the gray values of the pixel points in the image area currently framed by the image template which correspond to non-zero elements of the image template are all set to 0; otherwise, the pixel points in the image area currently framed by the image template are all assigned a value of 1 or greater than 0, so that the binary image (after the image to be processed is binarized image) is expanded by a tier to achieve the purpose of image expansion.

Those skilled in the art can easily understand that, in the matrix convolution operation, whenever the center of the image template is aligned with a pixel point of the image to be processed, each element in the image template and the values represented by the pixel point at the corresponding position covered by it are multiplied and added to obtain a convolution result element. If there is no pixel point in the area covered by each element in the image template, the value representing the pixel point is set to 0. Once the center of the image template has scanned all the pixel points of the image to be processed, each pixel point of the image to be processed undergoes the aforementioned multiplication and addition operation to obtain an output matrix as a convolution result matrix. Therefore, person skilled in the art generally select a matrix composed of $(2r+1)\times(2r+1)$ elements as the image template, and r is a positive integer. In order to obtain the convolution result elements corresponding to a certain pixel point covered by the center of the image template, it is needed to perform $(2r+1)\times(2r+1)$ times of multiplication and $(2r)^2$ times of addition. The number of calculations required to obtain each convolution result element is proportional to the second power of r. Furthermore, the image to be processed is a pixel matrix composed of $n\times n$ pixels (n is greater than $2r+1$). Whenever the center of the image template scans a pixel point of the image to be processed, the image template shifts once per unit pixel, until the center of the image template scans all the pixel points of the image to be processed, the image template accumulates happens $n^2$ unit pixel shifts. In order to obtain a convolution result matrix, accumulating $((2r+1)^2+(2r)^2)$ $n^2$ operations, $((2r+1)^2+(2r)^2)n^2$ operations make the complexity of calculation time increase quadratically, which affects the real-time performance of image convolution operations and constrains the speed of related image processing, including the speed of image expansion operations.

To sum up, in order to reduce the time complexity of the image expansion calculation and the associated image processing algorithm, in step A, the fast Fourier transform and the fast Fourier inverse transform are used successively to control the image template and the image to be processed in the form of multiplication in the frequency domain to obtain the convolution result elements in the space domain. This step A controls the conversion coefficient of the image template in the corresponding frequency domain to be multiplied by the conversion coefficient of the image to be processed in the corresponding frequency domain to replace the convolution operation between the image template and the image to be processed (that is, the matrix convolution operation between two pixel matrices), so as to obtain the same operation result, which is equal to the convolution result element in the corresponding space domain.

Specifically, fast Fourier transform, that is, a generic term for an efficient and fast calculation method using a computer to calculate discrete Fourier transform (DFT), is referred to as FFT. The discrete Fourier transform can sample the discrete points of the image spectrum at equal intervals in the interval from 0 degrees to 360 degrees, that is, the discretization of the sequence frequency spectrum, which is the physical meaning of DFT. Both the image template and the image to be processed are composed of discrete point matrices. In the form of discrete Fourier transform, the sequences at both ends of the transform (in time domain and frequency domain) are of finite length, but in fact these two sets of sequences should be considered as the principal value sequence of a discrete periodic signal. Even if DFT is performed on a finite discrete signal, it should be regarded as a periodic signal after period extension and then transformed. In this embodiment, fast Fourier transform is adopted to efficiently calculate DFT.

It should be noted that the Fourier transform transforms the image from the space domain to the frequency domain, and its inverse transform transforms the image from the frequency domain to the space domain. In other words, the physical meaning of Fourier transform is to transform the gray distribution function of the image into the frequency distribution function of the image, and the Fourier inverse transform is to transform the frequency distribution function of the image into the gray distribution function. Fast Fourier transform is a fast algorithm of discrete Fourier transform. When the data source is large (greater than 1000), fast Fourier transform has obvious advantages.

In some embodiments, the selected image template is a matrix composed of $(2r+1)\times(2r+1)$ elements, and the image to be processed is a pixel matrix composed of $n\times n$ pixels, where both n and r are positive integers, and n is greater than $2r+1$. By using fast Fourier transform to convert the image template and the image to be processed corresponding to the convolution from the space domain to the frequency domain, and then multiplying a transformation value of the image template in the frequency domain with a transformation value of the corresponding the image to be processed participating in a convolution operation in the frequency domain, and then undergoing the fast Fourier inverse transform to obtain a parameter matrix, as convolution result matrix, so that the $((2r+1)^2+(2r)^2)n^2$ operations consumed by the aforementioned matrix convolution operation are reduced to $(2r+1)n \log_2((2r+1)n)$ operations, which reduces the complexity of calculation time and accelerate the convolution of two-dimensional pixel points.

Therefore, when the size of the image to be processed is relatively large, in order to reduce the huge calculation time cost brought by the traditional convolution operation or expansion search operation, the present invention successively uses fast Fourier transform and fast Fourier inverse transform to speed up the convolution process of the image to be processed and the image template, to speed up the acquisition of the pixel points that need to be reassigned in the corresponding image area, and then to speed up the process of image expansion calculation, thereby reducing the number of calculations, especially the more discrete pixel points in the processed image, the more significant the calculation time saving degree of the present invention is. The use of fast Fourier transform instead of convolution operation is mainly to reduce the amount of calculation and storage overhead, and is particularly beneficial to hardware implementation.

At step B, if there is a convolution result element that satisfies a preset gray value condition, a gray value of a pixel point corresponding to the convolution result element in the image to be processed is set as a preset target gray value. If there is not convolution result element that satisfies a preset gray value condition, a gray value of a pixel point corresponding to the convolution result element in the image to be processed remains the original gray value. In this embodiment, in the matrix output by the aforementioned fast Fourier inverse transform, if it is detected that the value of a convolution result element satisfies the preset gray value condition, it is determined that when the center of the image template is equivalently translated to the corresponding position of the image to be processed, there is a pixel point with a specific gray value near the corresponding position and detected by the image template, then the gray value of the pixel point at the corresponding position is set as the preset target gray value, so as to achieve the purpose of expanding the pixel points of the preset target gray value in the image to be processed.

As an implementation manner, the step B specifically comprises: if it is detected that a value of the convolution result element is greater than 0, a gray value of a pixel point covered by a center of the image template corresponding to the convolution result element in the image to be processed is set as the preset target gray value, wherein the preset target gray value can be 0 or greater than 0. If it is detected that the value of the convolution result element is not greater than 0, the gray value of the pixel point covered by the center of the image template corresponding to the convolution result element in the image to be processed is controlled to remain unchanged. In this embodiment, the situation that the value of the convolution result element is greater than 0 is configured as the convolution result element meets the preset gray value condition. No matter whether there are values 1 and 0 in the elements of the image template, it will not cause a misjudgment during judging whether the value of the convolution result element is greater than 0, because the parameters of the image template after fast Fourier transform are equivalent to the parameters after cycle extension processing, and the image template and the image to be processed are both periodic signals in the process of fast Fourier transform and fast Fourier inverse transform, which is equivalent to the translation operation of the image template in the image to be processed in the process of matrix convolution operation. Therefore, the way of using value 0 to eliminate the influence of the region (black region) with a gray value of 0 in the image to be processed on the image processing, can be understood as a way of eliminating the influence of the invalid region in the image to be processed, and then extracting the pixel points where the gray value needs to be configured as the preset target gray value. By means of that way, the image expansion operation is accelerated to set the image pixel point as the pixel point of the preset target gray value, so as to realize the operation of increasing the area of the corresponding connected domain in the image to be processed. The invalid region excluded from the image to be processed is keep locating in the neighborhood of the pixel point covered by the center of the image template corresponding to the convolution result element, and the center of the image template corresponding to the convolution result element is the center of the image template that performs the actual convolution operation effect.

To sum up, for the equivalent convolution results obtained by fast Fourier transform and fast Fourier inverse transform of the image template and the image to be processed, when there is a pixel point with a preset search value present in a specific neighborhood of the image template (the image area framed by the image template) in the center of the image template, the gray value in the center of the image template is configured as the preset target gray value. Compared with the assignment processing of various gray values mentioned in the background, the present invention does not need to assign values to the pixel points outside the boundary of the image to be processed, so as to avoid the excessive expansion of the boundary points of the image to be processed and reduce the volume of data for processing the pixel points, to ensure real-time image processing.

As an embodiment, in the step B, if it is detected that the value of the convolution result element is greater than 0, it is determined that the image template corresponding to the convolution result element has a pixel point whose gray value is a preset search value in the image area framed in the image to be processed, and then it is determined that a convolution result element obtained in the currently executed step A satisfies the preset gray value condition. It can be understood that the gray value is a preset search value after the pixel points participating in the step A, the convolution result elements output by the step A meet the preset gray value condition. It can also be understood that in the case of the pixel points whose gray value is the preset search value are framed by the image template, after participating in the equivalent matrix convolution operation, one of the obtained convolution results satisfies the preset gray value condition. If it is detected that the value of the convolution result element is not greater than 0, it is determined that the image template corresponding to the convolution result element does not have a pixel point whose gray value is a preset search value in the image area framed in the image to be processed point, and then it is determined that the convolution result element output in the step A does not satisfy the preset gray value condition. Moreover, the preset search value is set to a value greater than 0 or a gray value greater than 0 (generally, the preset search value is set to 255), and when the image template is applied to the image expansion operation, the pixel points whose gray value is the preset search value are obtained by scanning through convolution, to create the necessity to compose the connected domains. That is, by setting the gray value of the pixel point covered by the center of the image template corresponding to the convolution result element to the preset target gray value, it can be merged with the pixel points with the gray value of the preset search value in the neighborhood to form the same type of pixel point, or it can be combined with the pixel point whose gray value is the preset target gray value in the neighborhood to form a white connected domain, which can form the boundary of the image to be processed, or smooth the initial image boundary. Preferably, the gray value of the pixel point covered by the center of the image template corresponding to the convolution result element can be the preset search value, and then be configured as the preset target gray value, wherein the preset search value can be equal to the preset target gray value.

It should be noted that the image template corresponding to the convolution result element is a convolution template configured to support translation in the image to be processed for a purpose of matrix convolution operation. It is worth noting that the limitation of the image template here is directed to the corresponding relationship between the convolution result elements and the pixel points participating in the aforementioned fast Fourier transform in the image to be processed. In this embodiment, no translation operation occurs in the image template. Specifically, there is no translation within the image to be processed being occurred, so as to avoid the multiplication calculation of the item-by-item window that needs to be performed in the convolution operation.

Preferably, the image template is a convolution kernel in the form of a matrix, and there are matrix elements with a value of 1 and matrix elements with a value of 0 in the image template. The matrix elements with a value of 1 distributed in the image template determine pixel points actually participating in the image processing method in the image to be processed. When the image template is used as a structural element, the element whose value is 1 in the image template determines whether the pixel points covered by the center of the image template or the neighboring pixel points of the pixel points covered by the center of the image template in the image to be processed need to participate in the calculation or not when doing the image expansion. By means of this, the computational complexity of using the image template as a convolution kernel to participate in the aforementioned matrix convolution operation or the aforementioned fast Fourier transform is simplified.

On the basis of the above embodiments, in the image template, the shape composed of matrix elements with a value of 1 is defined as the shape of the image template. The image template is a basic operator of morphology, and the rational selection of the image template directly affects the effect and quality of image processing. The shape of the image template comprises but not limited to a circle, a square, a rhombus, a hexagon, and a line segment. The circular image template, because of its isotropy, can obtain calculation results independent of the direction. The square and the rhombus can be regarded as the variation of the circle. The calculation results of the structural elements of different shapes will be different, and thus the shape should be properly selected according to the geometric shape of the image to be processed.

Specifically, the image template is used as a convolution kernel, and a shape effected for an actual calculation is a partial area composed of elements with a value of 1. In the image template, if the elements with a value of 1 form a circle, then the corresponding shape effected for the actual calculation in the image template is a circle. If the element with a value of 1 forms a rhombus in the image template, then the corresponding shape in the image template that effects the actual calculation is a rhombus. Therefore, whenever it is detected that the value of the convolution result element is greater than 0, the gray value of the pixel point covered by the center of the image template corresponding to the convolution result element in the image to be processed is set as the preset target gray value. After traversing all the convolution result elements output in step A, in the image to be processed, the shape formed by connecting pixel points whose gray value is the preset target gray value is the same as or adapted to the shape effected for the actual calculation in the image template.

Specifically, when the preset search value is greater than 0; or when the preset search value is converted to a mapping value of 1 according to a preset pixel value function, that is, the mapping value is a logical value 1, so as to convert the image to be processed to a binary image, all pixel points whose gray values are greater than 0 in the image to be processed are mapped to logic 1, and all pixel points whose gray values are equal to 0 in the image to be processed are mapped to logic 0. In some embodiments, the image to be processed can be regarded as a two-dimensional array, and then the image to be processed is converted into a binary image, where the binary image is a two-dimensional array with only 0 and 1. Moreover, the image template is configured as a convolution kernel whose element values are all 1, the center of the image template scans a specific pixel of a current image, and an "AND" operation is conducted for the image template and the binary image covered by the image template. If the result of an "AND" operation currently output is 1, the pixel point currently covered by the center of the image template corresponds to the result of the "AND" operation, and the result of the "AND" operation can reflect that the pixel point currently covered by the center of the image template and the neighborhood of the pixel point exist elements with a value of 1, and then further set the value of the pixel point currently covered by the center of the image template to 1, so that the pixel point whose value is 1 in the binary image is increased by one. If the result of an "AND" operation currently output is 0, the result of the "AND" operation can reflect that there is no element with a value of 1 in the image area currently framed by the image template (the pixel point itself currently covered by the center and its neighborhood), so there is no need to reassign the gray value of the pixel point covered by the center of the image template, and the original gray value remains unchanged.

As an embodiment, the step A specifically comprises transforming the image to be processed from the space domain to the frequency domain by using a two-dimensional discrete Fourier transform to obtain a first parameter matrix, wherein each matrix element of the first parameter matrix is the Fourier coefficient obtained by transformation. It should be noted that when the fast Fourier transform is processed by a computer device on a matrix signal such as an image, it is realized by using a two-dimensional discrete Fourier transform. Similarly, it can be conducted by transforming the image template from the space domain to the frequency domain by using a two-dimensional discrete Fourier transform to obtain a second parameter matrix, wherein each matrix element of the second parameter matrix is the Fourier coefficient obtained by transformation. The image template is a two-dimensional array, and participates in Fourier transform as a kind of matrix signal. It should be noted that, based on the result of the periodic extension processing that Fourier transform process involves, the number of Fourier coefficients in the second parameter matrix is equal to the number of Fourier coefficients in the first parameter matrix. Then, each matrix element of a first parameter matrix is multiplied with the matrix element of a matrix position in the second parameter matrix to obtain a third parameter matrix. It is worth noting that the multiplication of the aforementioned matrix element herein is different from the multiplication between the two matrices. Then, the third parameter matrix is transformed from the frequency domain to the space domain by using the two-dimensional discrete Fourier transform, so as to obtain a convolution result matrix, thereby realizing an obtainment of convolution result elements in a corresponding space domain in a form of multiplication in a corresponding frequency domain by controlling an image template and an image to be processed. Therefore, in this embodiment, when the image convolution operation is required, the above-mentioned fast Fourier transform and its inverse transform are used to reduce the operational time of matrix elements, making it possible to process image signals in real time, which mainly reduces the amount of calculation and storage overhead, and is particularly beneficial for hardware implementations.

It should be noted that the aforementioned convolution result elements in the space domain are arranged as a convolution result matrix, which is filled in the positions corresponding to one row and one column of the convolution result matrix. A relative position of a convolution result element in the convolution result matrix is the same as a relative position of the center of the image template corresponding to the same convolution result element in the image to be processed. It is worth noting that the relative position is a positional relationship of a matrix element relative to a matrix element of a fixed corner point position of the matrix to which it belongs. Preferably, this fixed corner point position includes but not limited to the pixel point in the upper left corner of the image to be processed, the pixel point in the upper right corner of the image to be processed, the pixel point in the lower left corner of the image, and the pixel point in the lower right corner of the image to be processed. The image to be processed exists in the form of a pixel matrix, including the gray value of each pixel point.

It should be noted that the aforementioned two-dimensional discrete Fourier transform and two-dimensional discrete Fourier inverse transform are essentially an algorithm that converts a polynomial represented by coefficients into its point value representation, thereby reducing the complexity of calculation time from the quadratic level to logarithmic level. When the number of processed pixels is large, the complexity of calculation time is reduced more obviously.

In the foregoing embodiment, the image template is equivalently configured as follows: during the translation process of the image template in the image to be processed, every time the center of the image template covers a pixel point of the image to be processed, the matrix convolution operation is performed by the elements existing in the image template itself and the pixel points in the image area currently framed by the image template, to obtain one convolution result element. The specific calculation steps of the matrix convolution operation can be referred to the aforementioned embodiment and will not be described here. After the center of the image template has traversed all the pixel points in the image to be processed, all the convolution result elements obtained through the matrix convolution operation form an output matrix, and the output matrix is equal to the convolution result matrix. It is worth noting that for the configuration of the action of the image template, this embodiment is limited to explain the technical effect of the matrix convolution operation that can be performed between the image template and the image to be processed, and points out that some of them can be used for the technical feature of two-dimensional discrete Fourier transform, but does not represent the actual translation of the image template in related embodiments. Therefore, a position matching relationship is established between each matrix element of the previously converted convolution result matrix and the pixel points participating in the fast Fourier transform in the image to be processed.

It should be noted that all elements in the image template are preconfigured. All elements in the image to be processed are also preconfigured. Moreover, the image to be processed can be a map, and then, the matrix element of the map matrix is the value at the map coordinate position or the gray value of the map image at the corresponding pixel point. The image template can also be composed of pixel matrices, The elements in the image template are gray values of pixel points at corresponding positions.

As a preferred embodiment, when it is detected that the value of the convolution result element is greater than 0, in the neighborhood of the pixel point covered by the center of the image template corresponding to the convolution result element within the image to be processed, there are pixel points with the gray value is the preset search value. Although this preferred embodiment cannot determine that the gray value of the pixel point covered by the image template corresponding to the convolution result element in the center of the image to be processed is the pixel point of the preset search value, it can determine that a convolution result element obtained by the currently executed step A satisfies the preset gray value condition. It can be understood that after the pixel point with the gray value of the preset search value participates in step A, the convolution result element output by the step A satisfies the preset gray value condition. It can also be understood that, in the case that pixel points whose gray value is the preset search value are framed by the image template, the obtained one of the convolution result elements satisfies the preset gray value condition after participating in the equivalent matrix convolution operation.

As an embodiment, each matrix element in the first parameter matrix is a Fourier coefficient described in the form of two-dimensional discrete Fourier transform, which can be understood as belonging to the result of periodic extension of the gray value of the relevant pixel point in the image to be processed. Each matrix element in the second parameter matrix is a Fourier coefficient described in the form of a two-dimensional discrete Fourier transform, which can be understood as belonging to the result of periodic extension of the value of the relevant element within the image template. In the process of performing the aforementioned fast Fourier transform and fast Fourier inverse transform, the number of rows of the third parameter matrix, the number of rows of the second parameter matrix and the number of rows of the first parameter matrix are all equal, at the same time, the number of columns of the third parameter matrix, the number of columns of the second parameter matrix and the number of columns of the first parameter matrix are all equal. The number of rows of the convolution result matrix is equal to the number of rows of the pixel matrix corresponding to the image to be processed, and the number of columns of the convolution result matrix is equal to the number of columns of the pixel matrix corresponding to the image to be processed. Thus, the second parameter matrix and the first parameter matrix are combined by using the symmetric and periodic properties of the exponential factor in the DFT calculation formula.

The whole process of the aforementioned two-dimensional discrete Fourier transform comprising: firstly calculating one-dimensional transformations row by row along each row of pixel points of the input image so as to transform out intermediate results, wherein the intermediate results form a sequence of intermediate results; calculating the one-dimensional transformations column by column along each column of pixel points in the intermediate result sequence, and finally obtaining an output matrix. It should be noted that the above order can be changed, that is, the corresponding one-dimensional transformation is performed first by column and then by row. Here, the one-dimensional transform belongs to the one-dimensional discrete Fourier transform suitable for periodic signals. Correspondingly, the above-mentioned process of calculating the transformation is also adaptively applied to the calculation of the two-dimensional inverse discrete Fourier transform, except that the aforementioned one-dimensional transformation is changed to one-dimensional inverse transformation. In summary, this embodiment decomposes the pixel matrix of the image to be processed and the image template into a series of short sequences respectively, and then fully utilizes the symmetric and periodic properties of the exponential factor in the DFT calculation formula to obtain the DFT corresponding to the short sequence and to conduct a proper combination, so as to remove repeated calculations and reduce multiplication operations, which in turn achieves the purpose of simplifying image convolution calculations.

What needs to be supplementally described is that in the process of processing the image to be processed or the image template by one-dimensional discrete Fourier transform, it is divided into two parts for calculation, and each part is composed of the same number of elements participating in the transformation calculation, wherein one part is set as an odd part of the discrete Fourier transform, and the other part is set as an even part of the discrete Fourier transform. The sum of the odd part of the discrete Fourier transform and the even part of the discrete Fourier transform results in one half of the Fourier coefficients of the discrete Fourier transform. The difference between the odd part of the discrete Fourier transform and the even part of the discrete Fourier transform results in the other half of the Fourier coefficients of the discrete Fourier transform. Therefore, in the frequency domain, for each time of backtracking, by means of only calculating the result of the discrete Fourier transform of half of the matrix elements of the image to be processed, the result of the discrete Fourier transform of the other half of the matrix elements of the image to be processed can be extrapolated. Therefore, the transformation calculation is reduced, thereby reducing the computational complexity, so that the magnitude of the calculation before and after the transformation is reduced from the magnitude of the power to the magnitude of the logarithm, making significant difference.

To sum up, after the image to be processed and the image template are input, the image processing method based on the convolution algorithm described in the foregoing embodiment is repeatedly executed. When it takes about 1 second for the image to be processed and the image template to output the convolution result matrix by performing the convolution matrix operation, the image processing method based on the convolution algorithm described in the foregoing embodiment only takes about 200 ms to output the same convolution result matrix.

The present invention also discloses a chip, which stores program codes corresponding to the image processing method based on a convolution algorithm disclosed in the foregoing embodiments. The program codes can reduce the amount of data for processing pixel points, and improve the real-time performance of image processing by the chip.

As an embodiment, the chip is integrated with a convolution hardware accelerator. The convolution hardware accelerator is used to convert a matrix convolution operation between the image to be processed and the image template into a convolution operation between two sequences. Moreover, each element in a sequence is a result of a one-dimensional discrete Fourier transform performed by the convolution hardware accelerator on a row of elements of the corresponding matrix (each element in a row of the matrix), or a result of a one-dimensional discrete Fourier transform performed by the convolution hardware accelerator on a column of elements of the corresponding matrix (each element in a column of the matrix). Each element in each sequence is obtained by parallel processing by the convolution hardware accelerator. One element is configured with only one register to participate in the one-dimensional discrete Fourier transform. The registers configured corresponding to different elements are executed in parallel, and the signal transmission path of each register does not interfere with each other. In this way, the speed of the two-dimensional discrete Fourier transform performed by the convolution hardware accelerator on the matrix signal is accelerated.

As an embodiment, the chip is integrated with a convolution hardware accelerator, the convolution hardware accelerator is used to multiply a transformation value of the image to be processed in the frequency domain with a transformation value of the corresponding image template participating in a matrix convolution operation in the frequency domain and output a parameter matrix, and then perform a one-dimensional discrete Fourier inverse transform on each row of elements of the parameter matrix in parallel to obtain an intermediate result sequence, and a one-dimensional discrete Fourier inverse transform on each column of elements of the intermediate result sequence in parallel to finally obtain a convolution result matrix so as to complete a two-dimensional inverse discrete Fourier inverse transform. Alternatively, the convolution hardware accelerator is also used to multiply a transformation value of the image to be processed in the frequency domain with a transformation value of the corresponding image template participating in a matrix convolution operation in the frequency domain and output a parameter matrix, and then perform a one-dimensional discrete Fourier inverse transform on each column of elements of a parameter matrix in parallel to obtain an intermediate result sequence, and a one-dimensional discrete Fourier inverse transform on each row of elements of the intermediate result sequence in parallel to obtain a convolution result matrix. Among them, only one register is configured for a row of elements to participate in the inverse transformation operation, the registers corresponding to different row elements are executed in parallel, and the signal transmission path of each register does not interfere with each other. The registers configured corresponding to all row elements process the corresponding input signal in parallel. Only one register is configured for a column of elements to participate in the inverse transformation operation, the registers corresponding to different column elements are executed in parallel, and the signal transmission path of each register does not interfere with each other. This embodiment can accelerate the speed of the convolution hardware accelerator to perform two-dimensional inverse discrete Fourier inverse transform on matrix signals.

Those of ordinary skill in the art can understand that all or part of the steps for implementing the above method embodiments can be completed by program instructions and related hardware. These programs can be stored in a computer-readable storage medium (such as ROM, RAM, magnetic disk or optical disk, and other various media that can store program codes). When the program is executed, the steps including the above-mentioned method are executed. Finally, it should be noted that the above embodiments are only used to illustrate the technical solutions of the present invention, rather than limiting them. Although the present invention has been described in detail with reference to the foregoing embodiments, those of ordinary skill in the art should understand that it is still possible to modify the technical solutions described in the foregoing embodiments, or perform equivalent replacements for some or all of the technical features; and these modifications or replacements do not make the essence of the corresponding technical solutions deviate from the technical solutions of the various embodiments of the present invention. scope.

What is claimed is:

1. An image processing method based on a convolution algorithm, comprising:

step A, using a fast Fourier transform and a fast Fourier inverse transform to control an image template and an image to be processed to obtain convolution result elements in a space domain in a form of multiplication in a frequency domain; and step B, in which if there is a convolution result element that satisfies a preset gray value condition, then a gray value of a pixel point corresponding to the convolution result element in the image to be processed is set as a preset target gray value.

2. The image processing method according to claim 1, wherein the step B further comprises:

a step that if it is detected that a value of the convolution result element is greater than 0, a gray value of a pixel point covered by a center of the image template corresponding to the convolution result element in the image to be processed is set as the preset target gray value.

3. The image processing method according to claim 2, wherein, the step B further comprises:

a step that if it is detected that the value of the convolution result element is greater than 0, it is determined that the image template corresponding to the convolution result element has a pixel point whose gray value is a preset search value in the image area framed in the image to be processed, and then determined that a convolution result element obtained in the currently executed step A satisfies the preset gray value condition;

wherein, the image template corresponding to the convolution result element is a convolution template configured to support translation in the image to be processed for a purpose of matrix convolution operation.

4. The image processing method according to claim 3, wherein the image template is a convolution kernel in the form of a matrix, and there are matrix elements with a value of 1 and matrix elements with a value of 0 in the image template, and wherein positional features of the matrix elements with the value of 1 distributed in the image template determine pixel points actually participating in the image processing method in the image to be processed.

5. The image processing method according to claim 4, wherein in the image template, a shape composed of the matrix elements with the value of 1 is defined as a shape of the image template.

6. The image processing method according to claim 4, wherein the preset search value is greater than 0; or the preset search value has a mapping value of 1 that is converted by a preset pixel value function.

7. The image processing method according claim 2, wherein the step A specifically comprises steps of transforming the image to be processed from the space domain to the frequency domain by using a two-dimensional discrete Fourier transform so as to obtain a first parameter matrix;

transforming the image template from the space domain to the frequency domain by using a two-dimensional discrete Fourier transform so as to obtain a second parameter matrix;

multiplying each matrix element of the first parameter matrix with a matrix element in a corresponding matrix position of the second parameter matrix so as to obtain a third parameter matrix; and using a two-dimensional discrete Fourier inverse transform to transform the third parameter matrix from the frequency domain to the space domain, and obtaining a convolution result matrix, so as to realize an obtainment of convolution result elements in a corresponding space domain in a form of multiplication in a corresponding frequency domain by controlling an image template and an image to be processed;

wherein, the aforementioned convolution result elements in the corresponding space domain are arranged as a convolution result matrix; a relative position of a convolution result element in the convolution result matrix is the same as a relative position of the center of the image template corresponding to the same convolution result element in the image to be processed; and the relative position is a positional relationship of a matrix element relative to a matrix element of a fixed corner position of the matrix to which it belongs.

8. The image processing method according to claim 7, wherein the image template is configured as follows: during a translation process of the image template in the image to be processed, every time the center of the image template covers a pixel point of the image to be processed, the matrix convolution operation is performed by the elements existing in the image template itself and the pixel points in the image area currently framed by the image template to obtain one convolution result element;

after the center of the image template has traversed all the pixel points in the image to be processed, all the convolution result elements obtained through the matrix convolution operation form an output matrix, and the output matrix is equal to the convolution result matrix;

wherein, all elements in the image template are preconfigured; all elements in the image to be processed are also preconfigured.

9. The image processing method according to claim 8, wherein when it is detected that the value of the convolution result element is greater than 0, in the neighborhood of the pixel point covered by the center of the image template corresponding to the convolution result element within the image to be processed, there are pixel points with the gray value which is the preset search value.

10. The image processing method according to claim 7, wherein each matrix element in the first parameter matrix is a Fourier coefficient described in a form of the two-dimensional discrete Fourier transform;

each matrix element in the second parameter matrix is a Fourier coefficient described in the form of the two-dimensional discrete Fourier transform;

the number of rows of the third parameter matrix, the number of rows of the second parameter matrix and the number of rows of the first parameter matrix are all equal;

the number of columns of the third parameter matrix, the number of columns of the second parameter matrix and the number of columns of the first parameter matrix are all equal;

the number of rows of the convolution result matrix is equal to the number of rows of a pixel matrix corresponding to the image to be processed;

the number of columns of the convolution result matrix is equal to the number of columns of a pixel matrix corresponding to the image to be processed.

11. A chip, wherein the chip stores a program code corresponding to the image processing method based on a convolution algorithm described in claim 1.

12. The chip according to claim 11, wherein the chip is integrated with a convolution hardware accelerator, the convolution hardware accelerator is used to convert a matrix convolution operation between the image to be processed and the image template into a convolution operation between two sequences;

wherein, each element in each sequence is a result of a one-dimensional discrete Fourier transform performed by the convolution hardware accelerator on a row of elements of a matrix, or a result of a one-dimensional discrete Fourier transform performed by the convolution hardware accelerator on a column element of a matrix; each element in each sequence is obtained by parallel processing by the convolution hardware accelerator.

13. The chip according to claim 11, wherein the chip is integrated with a convolution hardware accelerator, the convolution hardware accelerator is used to multiply a transformation value of the image to be processed in the frequency domain with a transformation value of the corresponding image template participating in a matrix convolution operation in the frequency domain and output a parameter matrix, and then perform a one-dimensional discrete Fourier inverse transform on each row of elements of the parameter matrix in parallel to obtain an intermediate result sequence, and a one-dimensional discrete Fourier inverse transform on each column of elements of the intermediate result sequence in parallel to finally obtain a convolution result matrix so as to complete a two-dimensional inverse discrete Fourier inverse transform; or the convolution hardware accelerator is used to multiply a transformation value of the image to be processed in the frequency domain with a transformation value of the corresponding image template participating in a matrix convolution operation in the frequency domain and output a parameter matrix, and then firstly perform a one-dimensional discrete Fourier inverse transform on each column of elements of a parameter matrix in parallel to obtain an intermediate result sequence, and secondarily perform a one-dimensional discrete Fourier inverse transform on each row of elements of the intermediate result sequence in parallel to finally obtain a convolution result matrix.

\* \* \* \* \*